F. G. DUNBAR.
LUBRICATOR GLASS SHIELD.
APPLICATION FILED SEPT. 7, 1911.
1,104,974.
Patented July 28, 1914.
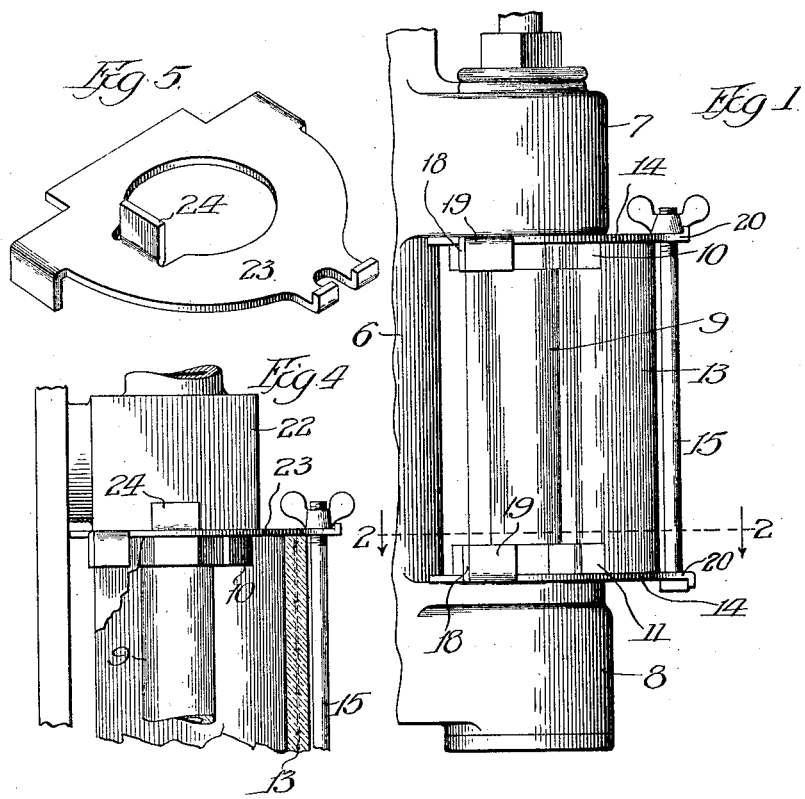
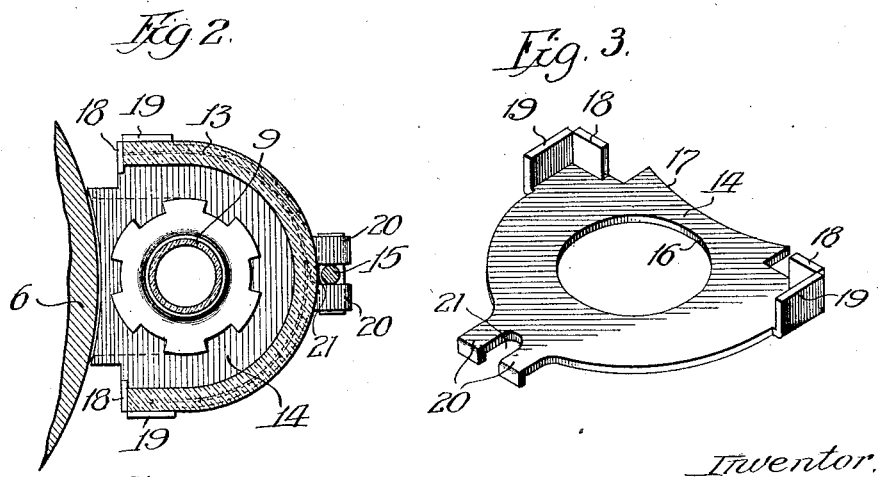
Witnesses:
Inventor:
Frank G. Dunbar
By Linthicum Belt & Fuller
Attys.

UNITED STATES PATENT OFFICE.

FRANK G. DUNBAR, OF CHICAGO, ILLINOIS, ASSIGNOR TO SARGENT COMPANY, OF CHICAGO, ILLINOIS, A CORPORATION OF ILLINOIS.

LUBRICATOR-GLASS SHIELD.

1,104,974.   Specification of Letters Patent.   Patented July 28, 1914.

Application filed September 7, 1911. Serial No. 648,065.

*To all whom it may concern:*

Be it known that I, FRANK G. DUNBAR, a citizen of the United States, residing at Chicago, in the county of Cook and State of Illinois, have invented certain new and useful Improvements in Lubricator - Glass Shields, of which the following is a specification.

This invention relates to lubricator-glass shields and aims to produce a device of this character which can be readily attached to locomotive lubricators of a single, double or triple sight-feed type, which will afford complete protection to the engineer against flying glass from broken sight-feed or gage glasses and which will not obstruct the view or interfere with the observation of the glasses.

Prior to my present invention various kinds of metallic shields have been employed in connection with lubricator-glasses of the glass tube type to protect the glasses and prevent particles of broken glass from flying upon fracture or explosion of the tubes. Metallic shields, however, partially obscure the glasses and interfere with their observation by the engineer and, furthermore, the slots through which the glasses are observed afford a source of escape for small particles of glass which frequently fly and strike the eyes of the engineer, causing loss of sight or at least severe injuries.

My present invention contemplates the employment of a glass protector reinforced with wire netting embedded therein, which absolutely precludes the scattering and flying of broken pieces of glass and does not interfere with the observation of the glass by the engineer from any angle, and in connection therewith provides novel clips for holding the glass protector in place, the clips being constructed to fit over and be held in position by the sight or gage-glass packing nuts and permit ready removal of the protector for purposes of cleaning the same.

The following description when considered in connection with the accompanying drawings illustrating those embodiments of my present invention, which at present appear to be preferable, will sufficiently explain the invention and its method of use.

Referring to the drawings—Figure 1 is a fragmentary side elevation of a lubricator body showing one gage-glass with my invention applied thereto: Fig. 2 is a longitudinal sectional view taken on the line 2—2 of Fig. 1: Fig. 3 is a perspective view of one of the clips shown in Fig. 1: Fig. 4 is a fragmentary view of a different form of lubricator with my invention applied thereto; and Fig. 5 is a perspective view of a modified form of clip particularly adapted for the type of lubricator shown in Fig. 4.

On the drawings and referring now more particularly to Figs. 1 and 2, 6 designates the body of the lubricator provided with the usual upper and lower sockets or extensions 7 and 8, the vertically disposed glass tube 9 serving either as a gage-glass or as a sight-feed glass is held in position in the sockets 7 and 8 in the usual manner by the packing nuts 10 and 11. The parts thus far described are of usual construction and vary slightly in size, proportion and configuration with various sizes and makes of the lubricators.

My improved shield which is adapted to serve as a protection from flying bits of glass in case of fracture or explosion of the gage or sight-feed glass 9, comprises a curved protector 13 made of thick glass with wire netting bedded therein, the clips 14 engaging the upper and lower ends of the protector, and the bolt or pin 15 which prevents the protector from disengagement with the clips. The protector as shown in Fig. 2 surrounds the front and sides of the glass 9, thus protecting the glass from external injuries and preventing the particles of broken glass from scattering in case the glass 9 should explode or in any way become broken.

The clips 14, as shown in Fig. 3, comprise a body portion preferably stamped up from heavy sheet-metal and provided with an aperture 16 adapted to fit over the shank of a packing nut. When positioning the clips on the lubricator the packing nuts are removed, inserted through the apertures 16 and then threaded back into the lubricator sockets. The heads of the packing nuts, as will be manifest will prevent the clips from dropping off and will securely hold them in position. In order that the clips may be held against rotation on the packing nuts, I have curved the back edge of the clips, as indicated at 17, to conform to the curvature of the body of the lubricator, so that this curved portion will abut against the body and prevent turning or displacement of the clips. For the purpose of holding the protector 13 against lateral or rearward movement on the clips, I bend upwardly at right angles to the plane of the body of each clip the rear corners thereof to form flanges 18 and likewise the sides to form the flanges 19. These flanges 18 and 19, as will be evident from Fig. 2, embrace the rear corners of the protector at the top and bottom and effectually hold the same against both lateral and rearward movement. At the front of the clips I have provided extensions or ears 20 providing a slot 21 therebetween to receive the bolt 15. The ends of the extensions are preferably bent in the opposite direction from the flanges 18 and 19 to engage with the head and nut of the bolt and thereby prevent the bolt from slipping out. Upon loosening of the nut, however, the bolt may be readily removed to permit the removal of the protector for purposes of cleaning the same or replacing it by a new one. When the parts are assembled, as shown in Fig. 1, the bolt 15 serves to clamp the protector between the clips 14 to prevent rattling of the same and also to prevent displacement of the protector.

The type of protector shown in Fig. 4 has a square socket 22 as distinguished from the curved sockets shown in Fig. 1, and to prevent the clip 23 from turning on the packing nut 10, I provide the clip with an upwardly extending flange 24 formed at the side of the packing nut receiving aperture. This flange or lip abuts against the flat side of the socket 22 and effectually holds the clip against turning. If the body of the lubricator provides a sufficient expanse of surface the rear edge of the clip may be shaped to conform thereto so that turning movement of the clip will be prevented by engagement of the rear edge with the surface of the body of the lubricator.

It is believed that my invention and many of its attendant advantages will be understood from the foregoing without further description, and it will be obvious that various changes in the mechanical details of the construction shown may be resorted to without departing from the spirit of the invention or sacrificing any of the material advantages thereof.

I claim:

1. A shield for lubricator-glasses, comprising a semi-tubular glass shield, top and bottom plate metal clips provided with alined openings to receive a lubricator-glass and fitting against the top and bottom respectively of the glass shield, the inner faces of the clips being free from obstructions at their fronts to permit of the shield being inserted sidewise between the clips, and means connecting the clips for drawing the same together and clamping them against the ends of the glass shield, the rear edge of each clip being shaped to fit against a portion of a lubricator body to prevent turning of the clip on the lubricator-glass.

2. A plate metal clip for a lubricator-glass shield having an opening to receive a lubricator tube, portions of the back and side edges of the clip being disposed to form ears at substantially right angles to the clip to embrace the side and back edges of a shield, the back edge of the clip between the ears being shaped to engage a lubricator body and prevent turning of the clip on the lubricator tube, and the face of the plate in front of the ears being free from obstructions, whereby a shield may be positioned upon the plate by sliding the shield sidewise thereon from front to rear and into engagement with the ears.

3. The combination of a lubricator, comprising a body, a sight or gage-glass and the packing nuts therefor, of a shield comprising a pair of clips permanently secured in position by said packing nuts and having provisions for engagement with the body of the lubricator, whereby turning of the clips on the nuts is prevented, a protector disposed between said clips and around the sight or gage-glass, projections formed on said clips for engaging with the rear edges of said protector, said clips being formed to permit the insertion of the protector therebetween from the front, and a bolt connecting the forward portions of said clips, said clips having projections serving to retain the bolt in position.

4. A clip for a lubricator-glass shield, comprising a body formed from a single piece of metal adapted to fit over a packing nut and having the corners projecting at right angles from the plane of the body to engage with the corners of a curved protector, said body being shaped to abut against the body of the lubricator whereby turning of the clip is prevented, and having a slotted ear at the front thereof to receive a protector retaining bolt.

5. A clip for a lubricator-glass shield, comprising a body formed of a single piece of metal having the corners projecting at right angles from the plane of the body to engage with the corners of a protector, said body being shaped to abut against the body of the lubricator to prevent turning of the clip, and having a slotted ear at the front thereof, the extremity of said ear being folded at right angles to the plane of the clip and adapted to receive a protector retaining bolt.

FRANK G. DUNBAR.

Witnesses:
 IRA J. WILSON,
 M. ROBERTSON.